(12) United States Patent
Wilson et al.

(10) Patent No.: US 12,549,113 B2
(45) Date of Patent: Feb. 10, 2026

(54) REBALANCING PULSE WIDTH MODULATION SIGNALS FOR POWER SYSTEMS

(71) Applicant: Cummins Power Generation Inc., Minneapolis, MN (US)

(72) Inventors: Oliver Daniel Wilson, Fridley, MN (US); Denise Maria Christine Athaide, Minneapolis, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 496 days.

(21) Appl. No.: 18/104,263

(22) Filed: Jan. 31, 2023

(65) Prior Publication Data
US 2024/0258903 A1 Aug. 1, 2024

(51) Int. Cl.
*H02M 7/5395* (2006.01)
*H02M 1/088* (2006.01)
*H02M 7/537* (2006.01)

(52) U.S. Cl.
CPC ......... *H02M 7/5395* (2013.01); *H02M 1/088* (2013.01); *H02M 7/537* (2013.01)

(58) Field of Classification Search
CPC .... H02M 1/088; H02M 7/537; H02M 1/0025; H02M 1/123; H02M 7/5395
See application file for complete search history.

(56) References Cited

U.S. PATENT DOCUMENTS

| | | | | |
|---|---|---|---|---|
| 5,610,806 A | * | 3/1997 | Blasko | H02M 7/5395 363/41 |
| 5,623,219 A | * | 4/1997 | Karraker | H03C 1/00 327/355 |
| 5,650,708 A | * | 7/1997 | Sawada | B60L 50/51 318/811 |
| 6,023,417 A | * | 2/2000 | Hava | H02M 7/53875 318/811 |

(Continued)

FOREIGN PATENT DOCUMENTS

| | | |
|---|---|---|
| CN | 104811072 B | 5/2017 |
| CN | 106787918 B | 5/2019 |

(Continued)

OTHER PUBLICATIONS

X. Li et al., "Analysis and Simplification of Three-Dimensional Space Vector PWM for Three-Phase Four-Leg Inverters," in IEEE Transactions on Industrial Electronics, vol. 58, No. 2, pp. 450-464, Feb. 2011, 15 pages.

(Continued)

*Primary Examiner* — Yusef A Ahmed
(74) *Attorney, Agent, or Firm* — Foley & Lardner LLP (57) ABSTRACT

Presented herein are systems, devices, and methods of rebalancing pulse width modulation (PWM) signals. A device can receive a plurality of PWM signals to be provided to a plurality of legs of an inverter. The device can identify a minimum value and a maximum value from at least a subset of the plurality of PWM signals. The device can determine a rebalance value based on a spread between the (Continued)

minimum value and the maximum value. The device can modify, using the rebalance value, a first PWM signal of the plurality of PWM signals to generate a second PWM signal to provide to a leg of the plurality of the legs of the inverter.

20 Claims, 7 Drawing Sheets

(56) References Cited

U.S. PATENT DOCUMENTS

| | | | |
|---|---|---|---|
| 6,031,738 A | 2/2000 | Lipo et al. | |
| 6,842,354 B1* | 1/2005 | Tallam | H02M 7/483 363/132 |
| 7,005,822 B1* | 2/2006 | O'Gorman | H02P 6/10 318/811 |
| 7,495,938 B2* | 2/2009 | Wu | H02M 7/487 363/172 |
| 8,300,438 B1* | 10/2012 | Herbert | H02M 1/4216 363/124 |
| 9,075,089 B2* | 7/2015 | Sakakibara | H02M 1/44 |
| 9,488,686 B2* | 11/2016 | Bhandarkar | H02M 5/4585 |
| 9,559,528 B2 | 1/2017 | Kim et al. | |
| 9,590,530 B2 | 3/2017 | Geyer | |
| 9,735,677 B2* | 8/2017 | Ihs | H02M 3/157 |
| 10,050,534 B1* | 8/2018 | Murthy-Bellur | H02M 3/24 |
| 10,158,299 B1* | 12/2018 | Wei | H02M 1/12 |
| 10,491,138 B1* | 11/2019 | Thompson | H02M 7/537 |
| 10,498,216 B1* | 12/2019 | Lee | H02M 1/08 |
| 10,541,535 B2 | 1/2020 | Qureshi | |
| 10,784,797 B1* | 9/2020 | Sedano | H02M 1/08 |
| 11,121,642 B2 | 9/2021 | Wang et al. | |
| 11,159,099 B2* | 10/2021 | Södö | H02M 1/126 |
| 2005/0063202 A1* | 3/2005 | Stancu | H02M 1/12 363/40 |
| 2005/0063205 A1* | 3/2005 | Stancu | H02M 7/53875 363/132 |
| 2008/0197902 A1* | 8/2008 | Welchko | H02M 7/5395 327/175 |
| 2009/0066384 A1* | 3/2009 | Suzuki | H02P 27/08 327/184 |
| 2011/0031914 A1* | 2/2011 | Green | H02P 6/06 318/400.11 |
| 2011/0031943 A1* | 2/2011 | Green | H02P 27/08 323/205 |
| 2011/0062934 A1* | 3/2011 | Wolf | H02M 7/48 323/304 |
| 2011/0141783 A1* | 6/2011 | Murali Dora | H02M 5/4585 363/127 |
| 2012/0140532 A1* | 6/2012 | Tallam | H02M 7/53875 363/37 |
| 2013/0181654 A1* | 7/2013 | Rozman | H02M 5/4585 318/721 |
| 2014/0042948 A1* | 2/2014 | Green | H02P 23/30 318/503 |
| 2014/0176027 A1* | 6/2014 | Osaki | H02P 6/28 318/400.2 |
| 2014/0297131 A1* | 10/2014 | Kashima | B62D 5/046 701/42 |
| 2014/0334206 A1* | 11/2014 | Valiani | H02M 7/487 363/97 |
| 2015/0131351 A1* | 5/2015 | Hart | H02M 7/537 363/131 |
| 2015/0145462 A1* | 5/2015 | Ulrich | H02M 5/458 363/37 |
| 2015/0229234 A1* | 8/2015 | Park | H02M 7/797 363/78 |
| 2015/0236615 A1* | 8/2015 | Xue | H02M 7/53875 363/97 |
| 2015/0256117 A1* | 9/2015 | Suzuki | H02P 27/085 62/160 |
| 2015/0303830 A1* | 10/2015 | Kang | H02J 3/381 363/71 |
| 2016/0006367 A1* | 1/2016 | Wei | H02M 7/537 363/131 |
| 2016/0211792 A1* | 7/2016 | Yamakawa | H02M 1/15 |
| 2016/0254760 A1* | 9/2016 | Zhang | H02M 7/48 363/95 |
| 2017/0009743 A1* | 1/2017 | Brogan | F03D 7/042 |
| 2017/0170728 A1* | 6/2017 | Ihs | H02M 3/158 |
| 2017/0310240 A1* | 10/2017 | Li | H02M 7/487 |
| 2018/0234032 A1* | 8/2018 | Araki | H02P 6/28 |
| 2019/0312521 A1* | 10/2019 | Cao | H02M 5/4585 |
| 2020/0244197 A1* | 7/2020 | Ooba | H02P 6/182 |
| 2020/0373854 A1* | 11/2020 | Tanaka | H02M 1/12 |
| 2021/0083615 A1* | 3/2021 | Zhang | H02P 27/12 |
| 2022/0166346 A1* | 5/2022 | Hart | H02M 7/5395 |
| 2022/0166362 A1* | 5/2022 | Yamasaki | H02M 1/0009 |
| 2022/0181999 A1* | 6/2022 | Orfanoudakis | H02P 21/13 |
| 2023/0117922 A1* | 4/2023 | Furukawa | H02M 7/5395 363/41 |
| 2023/0124942 A1* | 4/2023 | Wu | H02J 9/062 307/43 |
| 2023/0208339 A1* | 6/2023 | Kanamori | H02P 27/085 318/811 |
| 2023/0246572 A1* | 8/2023 | Jayaraman | H02P 6/28 388/811 |
| 2023/0412105 A1* | 12/2023 | Gibbs | H02P 27/085 |
| 2024/0136932 A1* | 4/2024 | Liu | H02M 1/14 |
| 2024/0154531 A1* | 5/2024 | Tan | H02M 3/1584 |
| 2024/0223117 A1* | 7/2024 | Dziuba | B60L 15/02 |
| 2024/0250603 A1* | 7/2024 | Tanaka | H02M 1/12 |

FOREIGN PATENT DOCUMENTS

| | | |
|---|---|---|
| EP | 1 706 938 A1 | 10/2006 |
| EP | 2 273 663 B1 | 11/2014 |
| EP | 3 783 790 A1 | 2/2021 |
| WO | WO-2011/084227 A2 | 7/2011 |
| WO | WO-2015/086265 A1 | 6/2015 |

OTHER PUBLICATIONS

Xu Junzhong et al: "A Carrier-Based Two-Phase-Clamped DPWM Strategy With Zero-Sequence Voltage Injection for Three Phase Quasi-Two-Stage Buck-Type Rectifiers", IEEE Transactions on Power Electronics, Institute of Electrical and Electronics Engineers, USA, vol. 37, No. 5, Nov. 25, 2021 (Nov. 25, 2021), pp. 5196-5211, XP011898490, ISSN: 0885-8993, DOI: 10.1109/TPEL.2021.3130677 [retrieved on Jan. 19, 2022].

International Search Report and Written Opinion for International Application No. PCT/US2024/012777, dated Jun. 6, 2024, 17 pgs.

* cited by examiner

REBALANCING PULSE WIDTH MODULATION SIGNALS FOR POWER SYSTEMS

TECHNICAL FIELD

The present disclosure relates generally to power systems, and in particular systems and methods of rebalancing pulse width modulation (PWM) signals.

BACKGROUND

A power system can accept or relay electrical power from various power sources to one or more components electrically coupled therewith. In furtherance of receiving or delivering electrical power, the power system can convert the power from direct current (DC) to alternating current (AC), and vice-versa.

SUMMARY

The present disclosure relates to techniques for rebalancing pulse width modulation (PWM) signals in power systems or subsystems. A signal rebalancer can receive a plurality of PWM signals to be conveyed via a power inverter from a controller (e.g., a closed-loop controller). At least one of the PWM signals can be used as a reference signal. From the remainder of the PWM signals, the signal rebalancer can identify the greatest spread between a minimum and maximum to calculate a rebalance value, and rebalance all the PWM signals using the rebalance value. By rebalancing in this manner, the signal rebalancer can allow for improved ability to generate a higher AC output voltage and drive larger kVA loads, with similar (e.g., within 90%) or lower DC input voltage. The signal rebalancer can also maintain the sinusoidal characteristics of the output, while providing for enhanced performance with higher efficiency and better and improved power quality.

At least one aspect is directed to a device for rebalancing pulse width modulation (PWM) signals. The device can include a computer-readable medium having instructions stored thereon. The device can include at least one processor configured to execute the instructions to receive a plurality of PWM signals to be provided to a plurality of legs of an inverter. The at least one processor can execute instructions to identify a minimum value and a maximum value from at least a subset of the plurality of PWM signals. The at least one processor can execute the instructions to determine a rebalance value based on a spread between the minimum value and the maximum value. The at least one processor can execute the instructions to modify, using the rebalance value, a first PWM signal of the plurality of PWM signals to generate a second PWM signal to provide to a leg of the plurality of the legs of the inverter.

In some embodiments, the at least one processor can execute the instructions to identify, from the plurality of PWM signals, a third PWM signal separate from the subset of the PWM signals. In some embodiments, the at least one processor can execute the instructions to modify the third PWM signal using the rebalance value to generate a fourth PWM signal to provide to a second leg of the plurality of inverters.

In some embodiments, the at least one processor can execute the instructions to identify, from a plurality of rebalance modes, a rebalance mode based on a configuration. In some embodiments, the at least one processor can execute the instructions to select, from a plurality of reference PWM signals in accordance with the rebalance mode, a reference PWM signal separate from the subset of the plurality of PWM signals, to be provided to a second leg of the plurality of legs of the inverter.

In some embodiments, the plurality of reference PWM signals comprises: (i) a first reference PWM signal having a zero duty cycle, (ii) a second reference PWM signal having a zero duty cycle prior to a transformation from a direct-quadrature-zero (DQ0) to three-phase, and (iii) a third reference PWM signal having the set duty cycle subsequent to the transformation. In some embodiments, the at least one processor can determine that none of the plurality of PWM signals correspond to a reference PWM signal. In some embodiments, the at least one processor can add, responsive to determining that none of the plurality of PWM signals correspond to the reference signal, the reference PWM signal set to null to the plurality of PWM signals.

In some embodiments, the at least one processor can determine that at least the subset of the PWM signals corresponds to a same phase condition. In some embodiments, the at least one processor can set, responsive to determining that at least the subset of the PWM signals corresponds to the same phase condition, the minimum value to null when determining the rebalance value. In some embodiments, the at least one processor can execute the instructions to determine, based on at least one of a sign of the minimum value or a sign of the maximum value, the spread between the minimum value and the maximum value to reduce over-modulation.

At least one other aspect of the present disclosure is directed to a system for providing electrical power using pulse width modulation (PWM) signals. The system can include a power source configured to provide electrical power. The system can include a controller structured to be coupled with the power source. The controller can convert the electrical power to a first plurality of PWM signals. The system can include a power inverter structured to be coupled with the controller. The power inverter can include a plurality of legs to receive a second plurality of PWM signals. The system can include a signal rebalancer structured to be coupled with the controller and the power inverter. The signal rebalancer can receive the first plurality of PWM signals from the controller. The signal rebalancer can identify a minimum value and a maximum value from at least a subset of the first plurality of PWM signals. The signal rebalancer can calculate a rebalance value based on a spread between the minimum value and the maximum value. The signal rebalancer can balance, using the rebalance value, the first plurality of PWM signals to generate the second plurality of PWM signals. The signal rebalancer can provide the second plurality of PWM signals to the plurality of legs of the power inverter.

In some embodiments, the system can include a plurality of power subsystems. Each power subsystem of the plurality of power subsystems can be electrically coupled with the power source. At least one of the plurality of power subsystems can house the controller, the power inverter, and the signal rebalance. In some embodiments, the controller can include (i) a voltage control configured to regulate a voltage for the first plurality of PWM signals and (ii) a current control configured to regulate a current for the first plurality of PWM signals. In some embodiments, at least one of the plurality of legs of the power inverter can correspond to a reference leg. The reference leg can provide at least one PWM signal having an amplitude less than at least one of a remainder of the plurality of PWM signals.

In some embodiments, the signal rebalancer can determine that none of the first plurality of PWM signals correspond to a reference PWM signal. In some embodiments, the signal rebalancer can generate, responsive to determining that none of the first plurality of PWM signals correspond to the reference signal, the reference PWM signal set to null to provide as the second plurality of PWM signals.

In some embodiments, the signal rebalancer can calculate, based on at least one of a sign of the minimum value or a sign of the maximum value, the spread between a magnitude of the minimum value and a magnitude of the maximum value. In some embodiments, the power inverter can provide the second plurality of PWM signals corresponding to the electrical power to one or more components electrically coupled with the power inverter.

At least one other aspect of the present disclosure is directed to a method of rebalancing pulse width modulation (PWM) signals. A processor can receive a plurality of PWM signals to be provided to a plurality of legs of an inverter. The processor can determine a spread between a minimum value and a maximum value from at least a subset of the plurality of PWM signals. The processor can generate a rebalance value based on the spread between the minimum value and the maximum value. The processor can modify, using the rebalance value, at least one PWM signal of the plurality of PWM signals. The processor can provide the at least one PWM signal to a leg of the plurality of the legs of the inverter.

In some embodiments, the processor can identify, from the plurality of PWM signals, the at least one PWM signal as a reference signal, the at least one PWM separate from the subset of the plurality of PWM signals. In some embodiments, the processor can select, from a plurality of reference PWM signals based on a configuration, a reference PWM signal separate from the subset of the plurality of PWM signals to be modified using the rebalance value.

In some embodiments, the plurality of reference PWM signals can include: (i) a first reference PWM signal having a zero duty cycle, (ii) a second reference PWM signal having a zero duty cycle prior to a transformation from a direct-quadrature-zero (DQ0) to three-phase, and (iii) a third reference PWM signal having the set duty cycle subsequent to the transformation. In some embodiments, the processor can determine, based on at least one of a sign of the minimum value or a sign of the maximum value, the spread between a magnitude of the minimum value and a magnitude of the maximum value. In some embodiments, the processor can provide, via the plurality of legs of the inverter to one or more electronic components, a second plurality of PWM signals generated using the plurality of PWM signals and the rebalance value.

It is to be understood that both the foregoing general description and the following detailed description are exemplary and explanatory only, and are not restrictive of the present teachings.

BRIEF DESCRIPTION OF THE DRAWINGS

The disclosure will become more fully understood from the following detailed description, taken in conjunction with the accompanying figures, wherein like reference numerals refer to like elements unless otherwise indicated, in which.

DETAILED DESCRIPTION

Following below are more detailed descriptions of various concepts related to, and implementations of, systems, methods, apparatuses, and devices for rebalancing pulse width modulation (PWM) signals in power systems. The various concepts introduced above and discussed in greater detail below may be implemented in any of a number of ways, as the described concepts are not limited to any particular manner of implementation. Examples of specific implementations and applications are provided primarily for illustrative purposes.

A power subsystem can deliver electrical power from a power generator or battery to one or more loads electrically coupled with the power subsystem. To facilitate the delivery, the power subsystem can include a controller (sometimes herein referred to as a grid supporting, yielding, or forming control), a pulse width modulator, and a power inverter (e.g., a three or four legged power inverter). At the input, the power subsystem can be coupled with the power supply. In addition, the controller at the input can perform direct current to direct current (DC/DC) conversion to alter the power level (e.g., from low voltage to high voltage) of the incoming power and output a set of signals to forward onto the pulse width modulator.

The pulse width modulator can apply modulation onto the set of signals to provide gating signals to provide to the power inverter toward the output of the power subsystem. The power inverter can perform alternating current (AC) to DC (AC/DC) conversion on the incoming modulated signal to output DC power to the loads and other components electrically coupled with the power subsystem. In some embodiments, the power inverter can perform DC/AC conversion on the incoming modulated signal to output the AC power to the loads and other components. While this architecture may be able to deliver electrical power under certain conditions, the power subsystem may be unable to sufficiently provide power for other conditions, for example, when there is an insufficient voltage charge on a high-voltage direct current (HVDC) connection of a DC/AC inverter.

One approach to addressing some of these problems may be to apply sinusoidal pulse width modulation (PWM) to the signals delivered by the controller to the pulse width modulator. The sinusoidal PWM may be applied to a three-phase reference frame (e.g., A-phase, B-phase, and C-phase) from the control. This approach, however, may be suffer from a number of limitations. For example, the power subsystem may still face low efficiency and high total harmonic distortion (THD) over some parts of the operating region, especially for higher AC output voltage and lower DC input voltages.

Furthermore, the power subsystem can suffer from overmodulation when the AC voltage specifications increases, when sinusoidal PWM is applied. The power subsystem can experience voltage clamping and over-modulation, when HVDC voltage specifications are decreased, when the actual HVDC voltage dips during transients, or when driving large kVA (e.g., high current) loads at high AC voltage with a low HVDC bus voltage. In addition, when there is over-modulation (e.g., PWM duty cycle command >1), this may mean that the command is to generate a current beyond the limit of the hardware such as the DC bus voltage. The over-modulation may be always clamped by gate drivers, resulting in the controller attaining a non-linear region of control.

Another approach may be to apply space vector modulation (SVM) techniques to the signals from the controller. Under this approach, the SVM may be applied on a direct-quadrature-zero (DQ0) as well as three-phase reference frame from the control, using look-up tables or complex mathematical equations to implement leg controls. This approach, however, may rely on heavy mathematical computations, therefore resulting in processor overhead. In addition, the SVM approach may be non-flexible and application-specific, and may have to be integrated early into the controller configuration process, as any changes to the SVM may result in significant alterations to the controller gains and tuning. Furthermore, the power system using SVM may not be enabled or disabled dynamically (e.g., upon command) without having separate control loops, resulting in additional hardware.

To address these and other technical challenges, a signal re-balancer can rebalance PWM signals from the controller to provide to the pulse width modulator and the power inverter. The signal re-balancer can receive a set of PWM signals from the controller. At least one of the PWM signals can be set aside by the signal re-balancer as a reference signal. The reference signal can be selected based on a rebalance mode configured for the signal re-balancer. For instance, the reference PWM signal may have a zero loop duty cycle prior to a transformation from a DQ0 to a three-phase or may have a neutral duty cycle after transformation from the DQ0 to the three-phase.

From the remainder of the PWM signals, the signal re-balancer can determine the greatest spread between a minimum and maximum. The signal re-balancer can identify the signage (e.g., positive or negative) of the minimum or the maximum values. Based on the spread, the signal re-balancer can calculate a rebalance value. Using the rebalance value, the signal re-balancer can adjust or balance all the PWM signals, including the reference PWM signal. Upon adjusting, the signal re-balancer can feed the rebalanced PWM signals forward to the pulse modulator and the power inverter.

By rebalancing the PWM signals in this manner, the signal re-balancer can enable higher high-voltage DC (HVDC) bus utilization, allowing for generation of a higher AC output voltage and drive larger kVA loads, with similar (e.g., within 90%) or lower DC input voltage. The signal re-balancer can also allow for the maintenance of the sinusoidal characteristics of the output, while providing for enhanced performed with higher efficiency and power quality. Since the rebalancing algorithm employed by the signal re-balancer is not computationally expensive and agnostic to the control topology generating the signals fed to the rebalancer, the same architecture of the power inverter can be used in the power system. This may eliminate the need to adopt bulky and more complex processors or magnetic or control hardware. Instead, the signal re-balancer can be dropped in onto post processing algorithm directly on phase control, sine pulse width modulation duty cycles, drivers, and control hardware of the power system.

In addition, the signal re-balancer can leverage a leg of the power inverter to which the reference PWM signal is to be provided to force the power inverter to operate in an optimal operating region. The optimal operating region can correspond to a modulation index or a duty cycle range in which the switching power electronics of the power inverter has the best performance. The signal re-balancer can provide for an ability to arbitrarily add an additional leg into a three-phase system and pack onto another control scheme, for example, by adding a fourth leg to a three-leg power inverter system. Furthermore, the signal re-balancer can be dynamically configured (e.g., by an operator of the power system) to switch between various reference signals.

Figure 1:
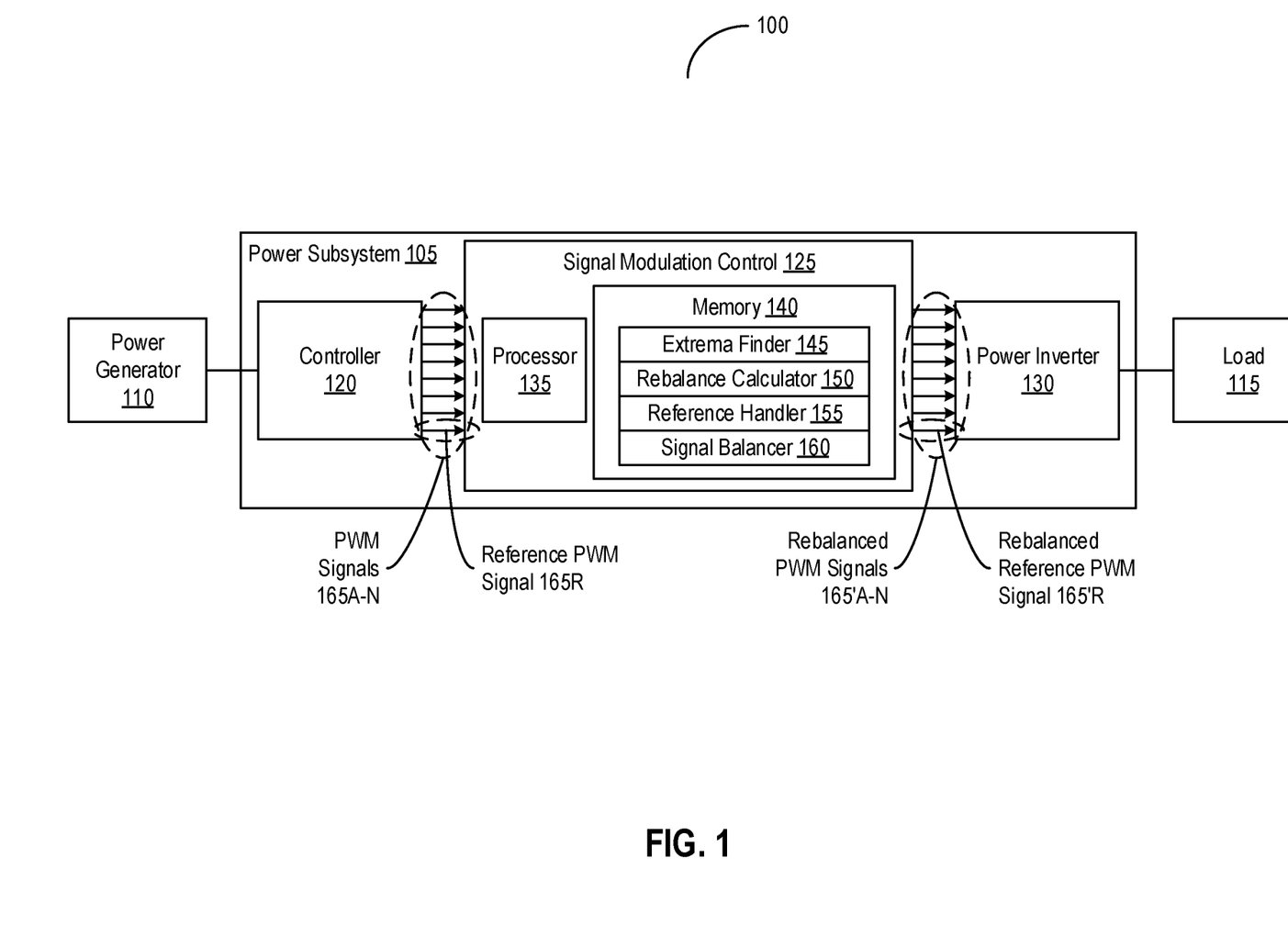
FIG. 1 depicts a block diagram of a system for rebalancing pulse width modulation (PWM) signals in power subsystems in accordance with an illustrative embodiment.

Referring now to FIG. 1, depicted is a block diagram of a system 100 for rebalancing pulse width modulation (PWM) signals in power subsystems. In brief overview, the system 100 can include one or more power subsystems 105, at least one power source 110, and at least one load 115, among others. Each power subsystem 105 can include at least one controller 120, at least one signal modulation control 125, and at least one power inverter 130, among others. The signal modulation control 125 (sometimes herein referred to as a signal re-balancer, a signal re-balancing unit, or a device) can include at least one processor 135 and at least one memory 140 storing instructions to be executed by the processor 135. The memory 140 can include instructions for at least one extrema finder 145, at least one rebalance calculator 150, at least one reference handler 155, and at least one signal balancer 160, among others.

Components of the power subsystem 105, such as the controller 120 or the signal modulation control 125 can be implemented using circuitry. The circuitry can include logic or machine-readable instructions to define the behavior, functions, and operations of the controller 120 or the signal modulation control 125. The circuitry may be implemented by computer readable media which may include code written in any programming language including, but not limited to, Java, JavaScript, Python or the like and any conventional procedural programming languages, such as the "C" programming language or similar programming languages.

The processors (e.g., the processor 135) in the power subsystem 105 can communicate with one or more remote processors. The remote processors may be connected to each other through any type of network (e.g., a CAN bus, etc.). The memory (e.g., RAM, ROM, Flash Memory, hard disk storage, etc.) may be a computer-readable medium to store data or computer code for facilitating the various processes described herein. The memory (e.g., the memory 140) may be communicably connected to the processing circuitry to provide computer code or instructions for executing at least some of the processes described herein. The memory may be or include tangible, non-transient volatile memory or non-volatile memory and may include database components, object code components, script components, or any other type of information structure for supporting the various activities and information structures described herein.

The power source 110 can generate, output, or otherwise provide electrical power. The power source 110 can include or correspond to any source of the electrical power for the system 100, such as a generator set, an energy storage module, a photovoltaic array, a wind power generator, a modular reactor, or a power station, among others. The power source 110 can be structured to be electrically coupled with the power subsystem 105 (e.g., via a bus or connector). As depicted for example, the power source 110 can be electrically coupled with the controller 120 of the power subsystem 105. The electrical power provided by the power source 110 to the power subsystem 105 can include a direct current (DC) power. In some embodiments, the electrical power can be withdrawn from an energy storage (e.g., a battery module) of the power source 110. In some embodiments, the system 100 can lack or omit the power source 110. For example, the power subsystem 105 can be physically separate from the power source 110 and be electrically coupled with a power source corresponding to the power source 110 to deliver the electrical power to the power subsystem 105.

In the power subsystem 105, the controller 120 (sometimes herein referred to as a grid supporting control, gate control, or a source control) can convey or pass the electrical power. The conveyance of the electrical power through the controller 120 (and by extension the power subsystem 105) can be in either direction. When the power source 110 is discharging to an external load, the controller 120 may accept, obtain, or otherwise receive the electrical power drawn from the power source 110. Conversely, when charging using an external source, the controller 120 may accept, obtain, or otherwise the electrical power from the external source to be directed to charge an internal electrical power storage (e.g., batteries in a battery module).

The controller 120 can apply or perform one or more transformations on the electrical power received from the power source 110. In some embodiments, the controller 120 can perform a voltage control on the voltage of the electrical power. The voltage control can be implemented using at least one proportional-integral (PI) loop for the voltage. In some embodiments, the controller 120 can perform current control on the current of the electrical power. The current control can be implemented using at least one proportional-integral (PI) loop for the current.

The controller 120 can also transform, change, or otherwise convert the electrical power into a set of pulse width modulation (PWM) signals 165A-N (hereinafter generally referred to as PWM signals 165). The set of PWM signals 165 may have any number of signals, and may include one or more PWM signals. In converting, the controller 120 can partition, separate, or otherwise divide the electrical power into a set of pulses of regulated voltage over a set interval of time, as the electrical power is received from the power source 110. The set of PWM signals 165 can be generated by the controller 120 to be delivered to or drawn from a corresponding set of legs (or inputs) of the power inverter 130. At least one in the set can correspond to or can be a reference PWM signal 165R. The use of the reference PWM signal 165R is to be detailed below. In some embodiments, the set of PMW signals 165 may initially lack the reference PWM signal 165R. For example, the set of PWM signals 165 may have one signal corresponding to a single phase, without any reference PWM signals 165R.

Continuing on, the number of PWM signals 165 in the set can correspond to (e.g., equal to) the number of legs of the power inverter 130. For instance, if the number of legs in the power inverter 130 is four (e.g., A-phase, B-phase, and C-phase, and reference legs), the controller 120 can generate four PWM signals 165 to be sent or delivered to the power inverter 130 can also be four. Each PWM signal 165 can have or can be defined by a duty cycle. The duty cycle can correspond to a proportion of time within a single interval of time when the voltage of the PWM signal 165 is high (e.g., "1"). The duty cycle can range from 0 to 100%. For instance, when the duty cycle is 75%, the corresponding PWM signal 165 can have high voltage over 75% of the interval and low voltage (e.g., "0") over 25% of the interval.

Upon generation, the controller 120 can provide or feed the set of PWM signals 165 forward to the signal modulation control 125 and the power inverter 130. The signal modulation control 125 can be electrically coupled with the controller 120 and the power inverter 130 (e.g., in series as depicted, in parallel, or any combination thereof). In some embodiments, the signal modulation control 125 can be a part of the controller 120. For example, the process 135 and the memory 140 of the signal modulation control 125 can be used to perform various operations as described above for the grid forming control 125. In some embodiments, the signal modulation control 125 can be separate from the controller 120.

The extrema finder 145 executing on the processor 135 of the signal modulation control 125 can retrieve, identify, or otherwise receive the set of PWM signals 165 from the controller 120. With the receipt, the extrema finder 145 can determine, calculate, or otherwise identify a minimum value and a maximum value from at least a subset of the set of PWM signals 165. The subset can correspond to or include the PWM signals 165 in the set, other than the at least one reference PWM signal 165R, and can be used to determine a rebalance value to which to balance all PWM signals 165 in the set. In some embodiments, the extrema finder 145 can select or identify the subset of PWM signals 165 from the overall set of PWM signals 165, remaining besides the reference PWM signal 165R. The identification of the minimum and maximum values can be at a given instance of time, as the PWM signals 165 are received at the spread detector 145.

Both the minimum and maximum value can be identified from a respective proportion of commanded on-time of gating signals corresponding to the subset of PWM signals 165. For instance, a value of 1.0 may correspond to a 100% top-switch on time and conversely—1.0 may correspond to a 100% bottom-switch on time. Continuing on, 0.00 may correspond to a 50% to 50% split of on-time between the top switch and the bottom switch. While the examples herein are primarily discussed in terms of a two-state context, the signal modulation control 125 may also be applicable to inverters with any number of states (e.g., tri-state devices). The minimum value can correspond to the lowest commanded on-time among the subset of PWM signals 165. The maximum value can correspond to the highest commanded on-time among the subset of PWM signals 165.

With the identification of the minimum and maximum values, the extrema finder 145 can modify, change, or otherwise set a sign of the minimum value or a sign of the maximum value. The sign can include or correspond to one of a positive ("+"), a negative ("−"), and a zero ("0"). The updating of the sign may be to amplify, enlarge, or maximize a difference between the minimum and maximum values of the subset of PWM signals 165. In setting, the extrema finder 145 can detect, determine, or otherwise identify the sign of the minimum value and the sign of the maximum value.

Based on the identified signs, the extreme finder 145 can change or maintain the signs of the respective values, while maintaining a magnitude for the value (e.g., the minimum or maximum value) itself. For the sign of the minimum value, if the sign of the minimum value is positive or zero, the extrema finder 145 can change the sign of the minimum value to negative. Otherwise, if the sign of the minimum value is negative, the extrema finder 145 can maintain the sign of the minimum value. For the sign of the maximum value, if the sign of the maximum value is the positive or zero, the extrema finder 145 can maintain the sign of the maximum value. Conversely, if the sign of the maximum value is negative, the extrema finder 145 can change the sign of the maximum value to positive.

In some embodiments, the extrema finder 145 can identify or determine whether the set of PWM signals 165 correspond to a same phase condition. To determine, the extrema finder 145 can identify or determine whether the minimum value and the maximum value are the same, prior to any changes to signs. When the minimum and maximum values differ, the extrema finder 145 can determine that the phase conditions are different across the set of PWM signals 165. The extrema 145 can maintain the minimum and maximum values as described above. On the other hand, when the minimum and maximum values are the same, the extrema finder 145 can determine that the set of PWM signals 165 correspond to the same phase condition. In response to the determination, the extrema finder 145 can assign or set the minimum value to null (e.g., "0").

The rebalance calculator 150 executing on the processor 135 of the signal modulation control 125 can calculate, identify, or determine a spread between the minimum value and maximum value of the subset of PWM signals 165. The determination of the spread can be based on the sign of the minimum value and the sign of the maximum value. The spread can be used to re-balance the overall set of the PWM signals 165 to prevent over-modulation. The spread can correspond to the difference between a magnitude of the minimum value and a magnitude of the maximum value. For example, the spread can correspond to the greatest difference between the minimum value set with the negative sign and the maximum value set with the positive sign. The rebalance calculator 150 can calculate the spread using the magnitude of the minimum value set with the negative sign and the magnitude of the maximum value set with the positive sign.

Based on the spread between the minimum value and maximum value of the subset of PWM signals 165, the rebalance calculator 150 can calculate, identify, or otherwise determine at least one rebalance value. In some embodiments, the rebalance calculator 150 can determine the rebalance value using the spread in accordance with a function. For instance, the rebalance calculator 150 can determine the rebalance value as a combination of the spread between the maximum and minimum values, with a corrective factor (e.g., a multiplicative factor between −0.5 and 2). The corrective factor and by extension the rebalance value can be used to alter or adjust the voltage amplitudes of the set of PWM signals 165, including the reference PWM signal 165R.

In conjunction, the reference handler 155 executing on the processor 135 of the signal modulation control 125 can modify, configure, or otherwise set the reference PWM signal 165R. In some embodiments, the reference handler 155 can produce, output, or otherwise generate the reference PWM signal 165R to include in the overall set of PWM signals 165. The reference PWM signal 165R can be separate from the subset of PWM signals 165 used to determine the rebalance value. By extension, the reference PWM signal 165R can correspond to the PWM signal 165 not used in determining the rebalance value. The reference PWM signal 165R can correspond to the PWM signal 165 to be sent or provided to a reference leg of the power inverter 130. The reference leg of the power inverter 130 can be separate or different from a remaining set of legs of the power inverter 130 to receive the subset of PWM signals 165.

In setting, the reference handler 155 can receive, retrieve, or otherwise identify at least one rebalance mode from a set of rebalance modes (sometimes herein referred as PWM rebalance modes) based on a configuration. The configuration may have been provided by an operator of the power subsystem 105 (e.g., using a human-machine interface), and can define or specify which rebalance mode is to be used. The set of rebalance modes can correspond to a set of candidate reference PWM signals to use as the reference PWM signal 165R. The set of rebalance modes can include, for example: a first rebalance mode to set the reference PWM signal 165R to have a zero duty cycle independent of a phase transformation; a second rebalance mode to set the reference PWM signal 165R to have a zero duty cycle prior to a transformation from a direct-quadrature-zero (DQ0) to three-phase; and a third rebalance mode to set the reference PWM signal 165R to have a set duty cycle subsequent to a transformation from a direct-quadrature-zero (DQ0) to three-phase.

In accordance with the specified rebalance mode, the reference handler 155 can identify or select the reference PWM signal 165R from the candidate set of reference PWM signals. When the mode is the first rebalance mode, the reference handler 155 can select the reference PWM signal 165R to have a zero duty cycle independent of a phase transformation. When the mode is the second rebalance mode, the reference handler 155 can select the reference PWM signal 165R to have a zero duty cycle prior to a transformation from a direct-quadrature-zero (DQ0) to three-phase. When the mode is the third rebalance mode, the reference handler 155 can select reference PWM signal 165R to have a set duty cycle subsequent to a transformation from a direct-quadrature-zero (DQ0) to three-phase. In general, the selected reference PWM signal 165R can have an amplitude (e.g., maximum or minimum voltage value over the time interval) that is lower than the amplitude of at least one of the remaining set of PWM signals 165. Upon selection, the reference handler 155 can use the reference PWM signal 165R to deliver or provide to the reference leg of the power inverter 130.

In some embodiments, the reference handler 155 can select the reference PWM signal 165R from the candidate set of reference PWM signals based on whether a transformation from the DQ0 to three-phase among the subset of PWM signals 165 is to be performed. The reference signal 155 can determine whether the transformation from the DQ0 to three-phase among the subset of PWM signals 165 is to be performed based on the configuration. The configuration may have been provided by an operator of the power subsystem 105 (e.g., using a human-machine interface), and can specify whether the transformation is to be performed. When the transformation is to be performed, the reference handler 155 can select the reference PWM signal 165R with the transformation from the DQ0 to three-phase (e.g., as with the second or third rebalance modes as discussed above). On the other hand, when the transformation is not to be performed, the reference handler 155 can select the reference PWM signal 165R without the transformation (e.g., as with the first rebalance mode as discussed above).

In some embodiments, the reference handler 155 can identify or determine whether none of the set of PWM signals 165 correspond to the reference PWM signal 165R. As described above, the set of PWM signals 165 can initially lack any reference PWM signal. To determine, the reference handler 155 can identify the set of PWM signals 165 corresponding to respective phase conditions (e.g., A-phase, B-phase, and C-phase for three-legged inverter). If at least one of the PWM signals 165 does not correspond to respective phase conditions, the reference handler 155 can determine that the set of PWM signals 165 include a reference PWM signal 165R and use the remaining signal as the reference. If all PWM signals 165 correspond to respective phase conditions, the reference handler 155 can determine none of the set of PWM signals 165 correspond to the reference PWM signal 165R. Responsive to the determination, the reference handler 155 can include or add a reference PWM signals 165R to the set of PWM signals 165. The reference PWM signal 165 can be set to null, or to any of the other reference modes as discussed above.

The signal balancer 160 executing on the processor 135 of the signal modulation control 125 can adjust, configure, or otherwise modify at least one PWM signal 165 of the overall set of PWM signals 165 based on the rebalance value. The modified PWM signal 165 can be fed forward or provided by the signal balancer 160 to a corresponding leg of the set of legs in the power inverter 130. In some embodiments, the signal balancer 160 can weigh or balance the at least one PWM signal 165 of the overall set of PWM signals 165 using the rebalance value. In modifying, the signal balancer 160 can aggregate or combine each PWM signal 165 of the set of PWM signals 165 with the rebalance value to generate a corresponding set of rebalanced PWM signals 165'A-N (hereinafter generally referred to as rebalanced PWM signals 165'). For instance, the signal balancer 160 can add the rebalance value to each PWM signal 165 to output or yield a respective, rebalanced PWM signal 165'. Upon generation, the signal balancer 160 can feed forward, convey, or otherwise provide the set of rebalanced PWM signals 165' to the corresponding set of legs of the power inverter 130.

In some embodiments, the signal balancer 160 can select or identify the at least one PWM signal 165 from the overall of PWM signals 165, including the reference PWM signal 165R. With the identification, the signal balancer 160 can balance or modify the at least one PWM signal 165 using the rebalance value. For instance, as the PWM signals 165 traverse through the signal modulation control 125, the signal balancer 160 can apply the rebalance value to the voltage values of the at least one PWM signal 165 to produce a corresponding rebalanced PWM signal 165'. With the application, the signal balancer 160 can feed the rebalanced PWM signal 165' to the power inverter 130.

In some embodiments, the signal balancer 160 can select or identify the reference PWM signal 165R from the overall set of PWM signals 165. With the identification, the signal balancer 160 can balance or modify the reference PWM signal 165 using the rebalance value to produce or generate a corresponding rebalanced, reference PWM signal 165'R. For example, upon selecting the reference PWM signal 165R to use, the signal balancer 160 can apply the rebalance value to the voltage values of the reference PWM signal 165R to produce a corresponding rebalanced PWM signal 165'R. With the application, the signal balancer 160 can feed the rebalanced PWM signal 165'R to the power inverter 130.

The power inverter 130 (sometimes herein referred to as a power inverter or rectifier) can obtain, accept, or otherwise the set of rebalanced PWM signals 165. As described above, the power inverter 130 can include the set of legs. The set of legs of the power inverter 130 can receive the corresponding set of rebalance PWM signals 165', which in turn can correspond to the set of PWM signals 165. The power inverter 130 can be structured to be electrically coupled with the signal modulation control 125 via the set of legs. At least one leg of the set of legs in the power inverter 130 can correspond to the reference leg to receive the rebalanced reference PWM signal 165'R. Each leg of the power inverter 130 can correspond to a phase of the AC electrical power to be delivered. For example, the power inverter 130 can include four legs, three for A-phase, B-phase, and C-phase and the remaining fourth for a reference signal. Although described having three-legs, in various embodiments, the power inverter 130 can have any number of legs.

Using the rebalanced PWM signals 165', the power inverter 130 can transform or convert the electrical power from AC to DC (e.g., using an active rectifier). In some embodiments, the power inverter 130 can transform the electrical power from DC to AC. As discussed above, the electrical power may be passed through the power subsystem 105 in either direction. The power inverter 130 may be coupled in series or in parallel to any power source 110, such as another inverter, a genset, a utility or power grid, among others. Upon transformation, the power inverter 130 can convey, send, or otherwise provide the electrical power (e.g., in the form of AC) to the one or more loads 115 (sometimes herein referred to as electric components or components). The power inverter 130 can include one or more components, such as an inverter and rectifier, and any combination thereof, to perform the DC to AC conversion. In some embodiments, the power inverter 130 can feed forward or provider the AC electrical power corresponding to the set of rebalanced PWM signals 165' to the load 115. The load 115 can include or correspond to any component electrically coupled with the power subsystem 105 to use, spend, or otherwise consume the electrical power originating from the power subsystem 105. The load 115 can include, for example, analog electronics, computer devices, and electric vehicles, among others, among others.

While the features are described as being performed by individual sub-components (e.g., the extrema finder 145, rebalance calculator 150, reference handler 155, and the signal balancer 160, among others), in various implementations the features may be performed by the processor 135 and can be implemented via one or more of the other elements of memory 140 or different elements. For example, the processor 135 of the signal modulation control 125 can execute instructions defining the extrema finder 145, rebalance calculator 150, reference handler 155, and the signal balancer 160, among others as stored and maintained on the memory 140.

Figure 2A:
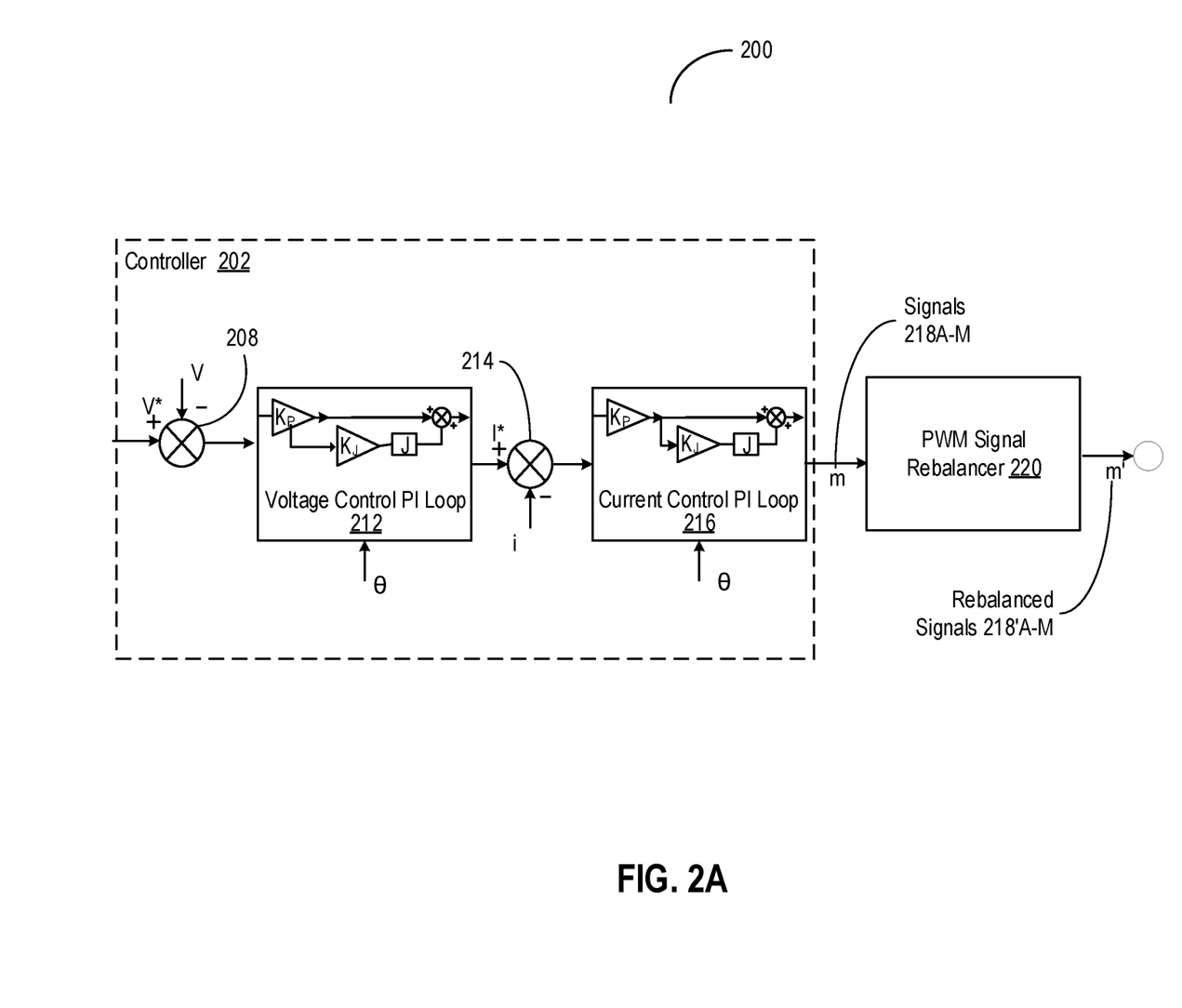
FIGS. 2A and 2B depict a circuit diagram of a power system to provide electrical power using pulse width modulation (PWM) signals in accordance with an illustrative embodiment.
Figure 2B:
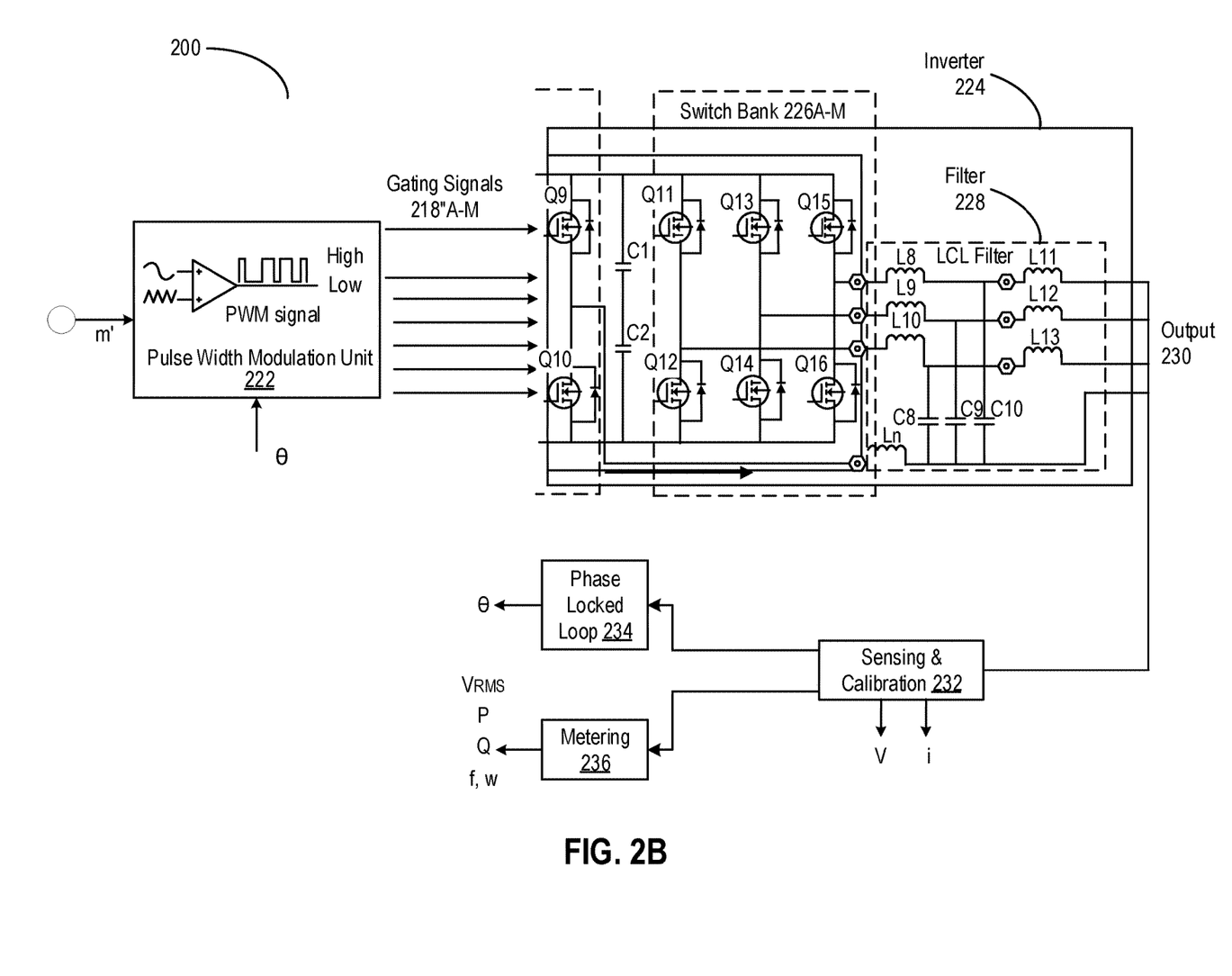

Referring now to FIGS. 2A and 2B, depicted is a circuit diagram of a power system 200 to provide electrical power using pulse width modulation (PWM) signals. The power system 200 can be a part of or can be include one or more components of systems 100 detailed herein above. Starting from FIG. 2A, the power system 200 can include at least one controller 202. The controller 202 can receive direct current (DC) electrical power from a power source for conversion into alternating current (AC) electrical power to provide to components electrically coupled with the power system 200.

The controller 202 can include at least one voltage control proportional (P) and integral (I) loop 212, at least one current multiplier 214, and at least one current control PI loop 216, among others. The voltage PI loop 212 can accept, obtain, or otherwise receive an input voltage from a power source. The voltage PI loop 212 can further regulate the voltage of the electrical power received at the controller 202. The voltage PI loop 212 can feed the output forward to the current multiplier 214 to modify (e.g., via multiplication with a configured input) the output current. The current control PI loop 216 can accept, obtain, or otherwise receive the output from the voltage control PI loop 212 via the current multiplier 214. The current control PI loop 216 can further regulate the current of the electrical power received at the controller 202. From regulating, the current control PI loop 212 produce, output, or otherwise generate a set of signals 218A-M (hereinafter generally referred to as signals 218). The set of signals 218 can be pulse width modulated (PWM), with an initial set of duty cycle characteristics. At least one of the signals 218 can serve as a reference signal for the remainder of the signals.

The power system 200 can include at least one pulse width modulation (PWM) signal re-balancer 220. The PWM signal re-balancer 220 can receive the set of signals 218 from the current control PI loop 216 of the controller 202. The PWM signal re-balancer 220 can perform rebalancing on the set of signals 218 to produce, output, or otherwise generate a set of rebalanced signals 218'A-M (hereinafter generally referred to as rebalanced signals 218'). To perform the rebalancing, the PWM signal re-balancer 220 can identify a minimum value and a maximum value of voltages from at least a subset of the signals 218 (e.g., M−1 signals 218, which can exclude the reference signal). The PWM signal re-balancer 220 can determine a rebalance value based on a spread between the minimum and maximum values. With the determination, the PWM signals re-balancer 220 can change, adjust, or otherwise modify (e.g., via addition) each of the signals 218 (including the reference signal) in accordance with the rebalance value to output a corresponding rebalanced signal 218'.

Moving onto FIG. 2B, the power system 200 can at least one pulse width modulation unit 222 and at least one inverter 224. The pulse width modulation unit 222 can accept, obtain, or otherwise receive the set of rebalanced signals 218' from the PWM signal re-balancer 220. Using the set of rebalanced signals 218', the pulse width modulation unit 222 can produce, output, or otherwise generate a set of gating signals 218"A-M (hereinafter generally referred to as gating signals 218"). In some embodiments, the pulse width modulation unit 222 can be a part or can include the PWM signal re-balancer 220. The pulse width modulation 222 can feed or provide the set of gating signals 218" to a set of corresponding inputs or legs of the inverter 224.

The inverter 224 can include a set of switch banks 226A-M (hereinafter generally referred to switch banks 226) and at least one filter 228. The set of switch banks 226 can correspond to the set of legs or inputs for the inverter 224, and can perform processing (e.g., DC to AC conversion) for the inverter 224. The filter 228 can filter out or suppress harmonics of the current absorbed by the inverter 224 from reaching other components to which the electrical power is to be delivered. The inverter 224 can provide or feed forward a set of output signals 230. The power system 200 can include at least one sensing and calibration unit 232, at least one phase locked loop 234, and at least one metering unit 236, among others. The sensing and calibration unit 232 can provide instrumentation on the voltage and current of the electrical power of the output 230 from the inverter 224. The phase locked loop 234 can provide a phase of the electrical power of the output 230. The metering unit 236 can gather other information about the electrical power of the output 230.

Figure 3:
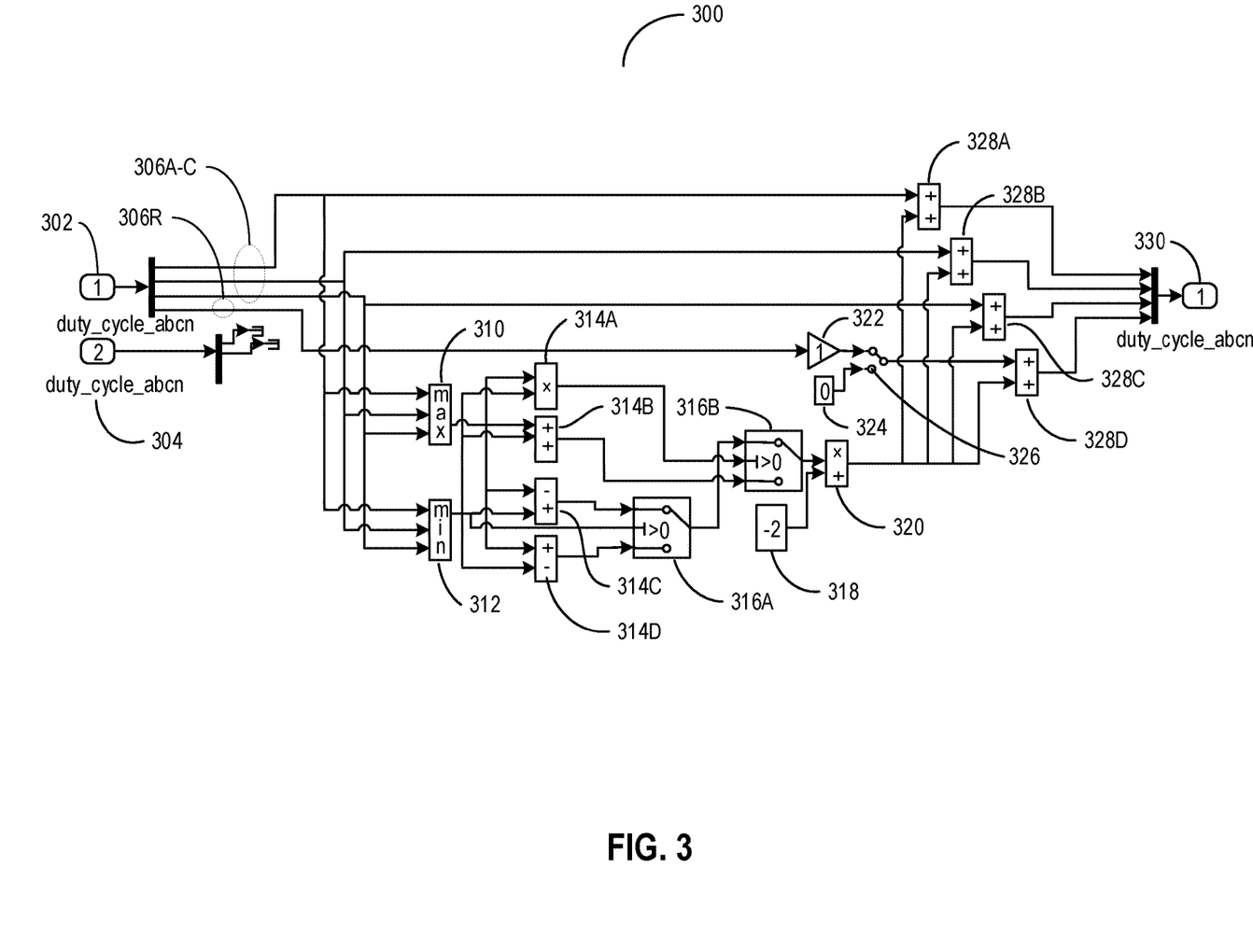
FIG. 3 depicts a circuit diagram of a device for rebalancing pulse width modulation (PWM) signals for a four-legged power inverter in accordance with an illustrative embodiment.

Referring now to FIG. 3, depicted is a circuit diagram of a device 300 for rebalancing pulse width modulation (PWM) signals for a four-legged power inverter. Each of the components in the device 300 can be implemented using hardware (e.g., microcontroller or logic chipsets) or a combination of hardware and software (e.g., processor coupled with memory storing instructions). The device 300 can include at least one input 302 for three-phase signals (e.g., A-phase, B-phase, C-phase, and reference). In some embodiments, the device 300 can include at least one input 304 for direct-quadrature-zero (DQ0) signals. While the signals from input 302 or 304 can be feed through the device, the depicted example and the description herein focuses on the signals from input 302. The input 302 can include a set of three pulse width modulated (PWM) signals 306A-C for the three-phases and a reference PWM signal 306R.

The device 300 can include at least one maximum finder 310 and at least one minimum finder 312. The maximum finder 310 can receive the set of three PWM signals 306A-C as input, identify a maximum value (e.g., highest voltage value) from among the three PWM signals 306A-C, and output the maximum value. The minimum finder 312 can receive the set of three PWM signals 306A-C as input, identify a minimum value (e.g., highest voltage value) from among the three PWM signals 306A-C, and output the minimum value. The reference PWM signal 306R may not be fed through the maximum finder 310 or the minimum finder 312.

The device 300 can include a set of aggregators 314A-D to perform or carry out a corresponding set of operations on the minimum and maximum values. The first aggregator 314A can generate a product of the minimum and maximum values. The second aggregator 314B can generate a difference between the minimum and maximum values with their respective signs (e.g., positive and negative). The third aggregator 314C can generate a difference between the maximum value with a reversed sign (e.g., negative to positive conversion) and the minimum value with the original sign. The fourth aggregator 314D can generate a difference between the maximum value with the original sign and the minimum value with a reversed sign (e.g., positive to negative).

The device 300 can include a set of selectors 316A and 316B to select at least one of the outputs from the set of aggregators 314A-D. The first selector 316A can select the output from the third aggregator 314C or the fourth aggregator 314D based on a sign of the minimum value from the minimum finder 312. When the minimum value is positive, the first comparator 316A can select the output from the third aggregator 314C. Otherwise, when the minimum value is negative, the first selector 316A can select the output from the fourth aggregator 316D. The second selector 316B can select the output from the output from the second aggregator 314B or the output from the first selector 316A based on the product output from the first aggregator 314A. When the product between the maximum and minimum values is positive, the second selector 316B can select the output from the first selector 316A. Otherwise, when the product between the maximum and minimum values is negative, the second selector 316B can select the output from the second aggregator 314B. The output can correspond to a spread between the minimum value with a negative sign and maximum value with a positive sign.

The device 300 can include at least one corrective factor generator 318 and at least one aggregator 320. The aggregator 320 can receive a corrective factor (e.g., "−2" as depicted) from the corrective factor generator 318 and the spread output from the second selector 316B. The aggregator 320 can combine (e.g., multiply or divide) the spread from the second selector 316B with the corrective factor to generate a rebalance value. In conjunction, the device 300 can include at least one unity amplifier 322, at least one null value provider 324, and at least one switch 326. The unity amplifier 322 can maintain the amplitude of the reference PWM signal 306R. The null value provider 324 can generate or provide a null signal to substitute the reference PWM signal 306R. The switch 326 can select between the reference PWM signal 306R received at the input or the null signal from the null value provider 324 based on a configuration of the device 300 (e.g., configuration from operator). Upon selection, the switch 326 can feedforward the selected signal (e.g., the original reference signal PWM 306R as depicted).

The device 300 can include a set of adders 328A-D to combine the rebalance value from the aggregator 320 to each of the input including the three PWM signals 306A-C and the reference PWM signal 306R. The first adder 328A can add the rebalance value to the first PWM signal 306A. The second adder 328B can add the rebalance value to the second PWM signal 306B. The third adder 328C can add the rebalance value to the third PWM signal 306C. The fourth adder 328C can add the rebalance value to the reference PWM signal 306R. The device 300 can output at least one output 330. The set of adders 328A-D can feedforward the PWM signals 306A-C and 306R as the output of the overall device 100.

Figure 4A:
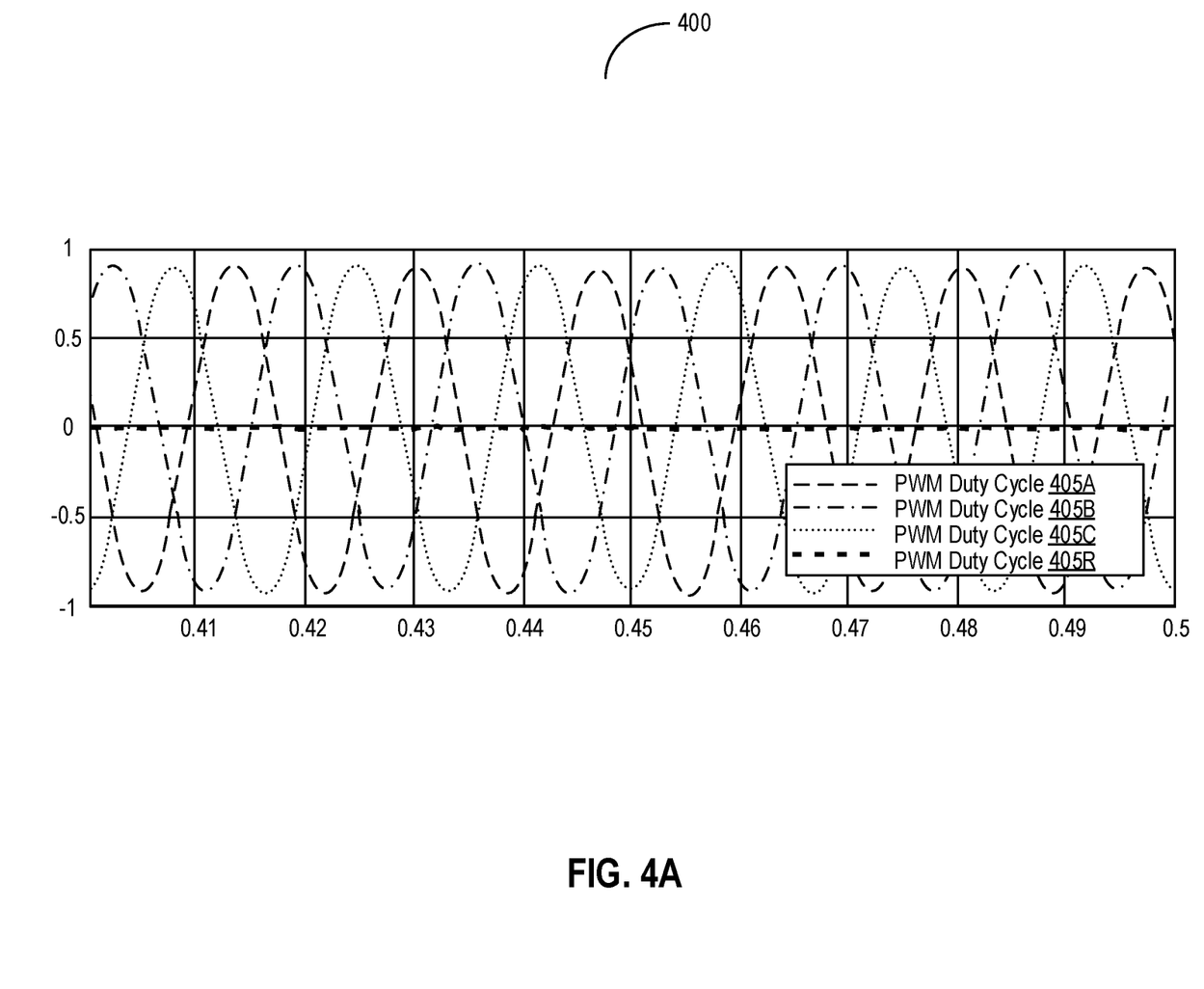
FIG. 4A depicts a graph of example duty cycles of pulse width modulation (PWM) signals for a four-legged power inverter prior to rebalancing in accordance with an illustrative embodiment.

Referring now to FIG. 4A, depicted is a graph 400 of example duty cycles of pulse width modulation (PWM) signals for a four-legged power inverter prior to rebalancing. The graph 400 shows duty cycle of PWM signals over time, for providing electrical power to a load of 6.25 k with a power factor of 0.8, AC voltage of 120 VRMS, and DC voltage of 400V. The graph 400 may include three PWM duty cycles 405A-C corresponding to three PWM signals for three legs of a four-legged power inverter. The graph 400 may also include a reference PWM duty cycle 405R corresponding to the reference PWM signal for a fourth leg (e.g., reference leg) of the four-legged power inverter. As seen, the PWM duty cycles 405A-C can vary in a sinusoidal manner between a minimum and maximum duty cycle. The reference PWM duty cycle 405R may be null throughout time.

Figure 4B:
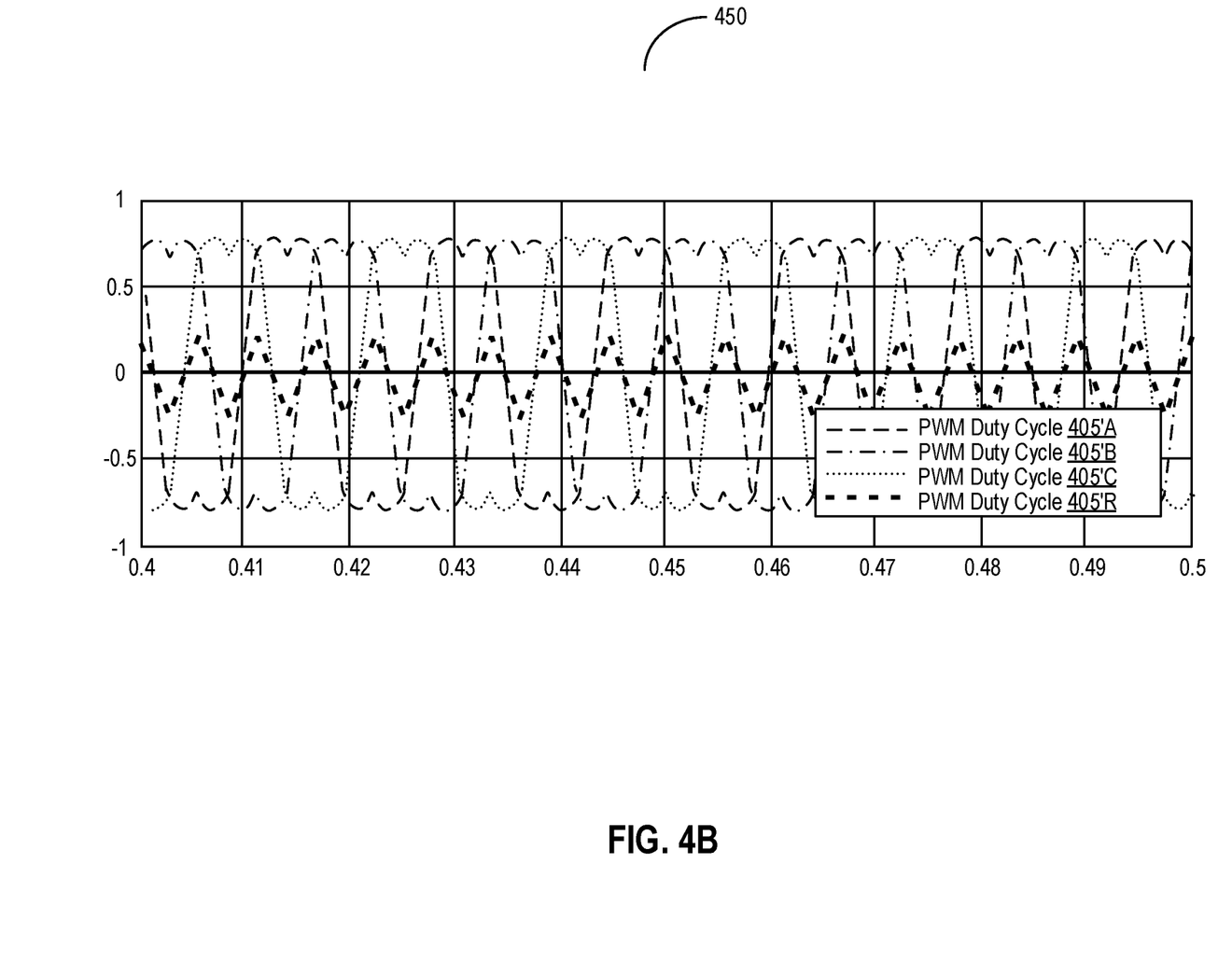
FIG. 4B depicts a graph of example duty cycles of pulse width modulation (PWM) signals for a four-legged power inverter subsequent to rebalancing in accordance with an illustrative embodiment.

Referring now to FIG. 4B, depicted is a graph 450 of example duty cycles of pulse width modulation (PWM) signals for a four-legged power inverter subsequent to rebalancing. The graph 450 may show results of rebalancing to the PWM signals depicted in the graph 400. The graph 450 may include three rebalanced PWM duty cycles 405'A-C corresponding to three PWM signals for three legs of a four-legged power inverter. The graph 450 may also include a rebalanced reference PWM duty cycle 405R corresponding to the reference PWM signal for a fourth leg (e.g., reference leg) of the four-legged power inverter. As shown, the PWM duty cycles 405A-C can vary in a non-sinusoidal manner between a minimum and maximum duty cycle. The reference PWM duty cycle 405R may behave similar to a triangle function over time.

Figure 5:
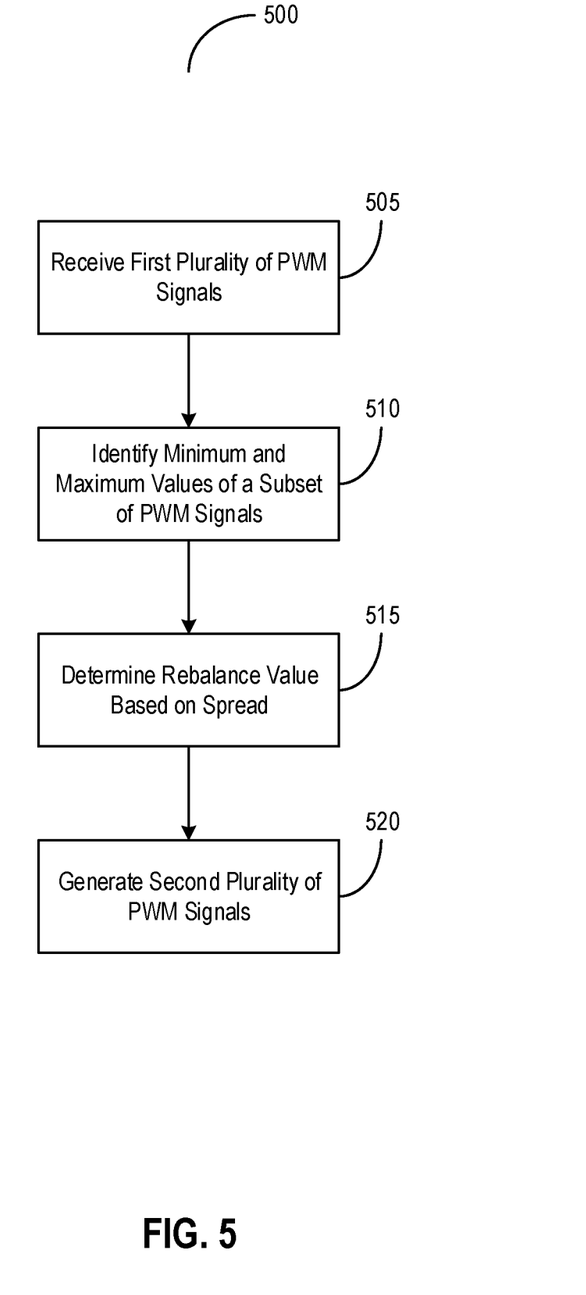
FIG. 5 depicts a flow diagram of a method of rebalancing pulse width modulation (PWM) signals in power subsystems in accordance with an illustrative embodiment.

Referring now to FIG. 5, depicted is a flow diagram of a method 500 of rebalancing pulse width modulation (PWM) signals in power subsystems. The method 500 can be implemented by or performed using any of the components discussed herein. In brief overview, a processor can receive a first plurality of PWM signals (505). The processor can identify minimum and maximum values of a subset of PWM signals (510). The processor can determine a rebalance value based on a spread between the minimum and maximum values (515). The processor can generate a second plurality of PWM signals using the rebalance value (520).

In further detail, a processor (e.g., the processor 135 of the signal modulation control 125) can receive a first plurality of PWM signals (e.g., the set of PWM signals 165) (505). The processor can receive the first plurality of PWM signals from a grid forming control (e.g., the controller 120) to be provided to a corresponding plurality of an inverter (e.g., the power inverter 130). The first plurality of PWM signals can be used to convey electrical power. Each of the first plurality of PWM signals can have a duty cycle ranging between 0 and 100. At least one PWM signal (e.g., the reference PWM signal 165R) can correspond to a reference PWM signal.

In some embodiments, the processor can identify at least one PWM signal from the first plurality of PWM signals as the reference PWM signal (e.g., the reference PWM signal 165R). The reference PWM signal can be separate or different from a remaining subset of the first plurality of PWM signals. In some embodiments, the processor can select the reference PWM signal to use from a plurality of candidate reference PWM signals based on a configuration (e.g., provided by the operator). The plurality of candidate reference PWM signals can include: a reference PWM signal having a zero duty cycle, a reference PWM signal having a zero duty cycle prior to a transformation from a direct-quadrature-zero (DQ0) to three-phase, and a reference PWM signal having the set duty cycle subsequent to the transformation The processor can identify minimum and maximum values of a subset of PWM signals (510). The processor can select the subset of PWM signals from the first plurality of PWM signals excluding the reference PWM signals. The minimum value can correspond to a lowest voltage value among the subset of PWM signals and maximum value can correspond to a highest voltage value among the subset of PWM signals. In some embodiments, the processor can change a sign of the minimum value or a sign of the maximum value to augment a difference between the minimum value and the maximum value.

The processor can determine a rebalance value based on a spread between the minimum and maximum values (515). The processor can determine the spread between the minimum value and the maximum value among the subset of PWM signals. In some embodiments, the processor can determine the spread based on a sign of the minimum value and a sign of the maximum value. The spread can correspond to the greatest difference between the magnitude of the minimum value and the magnitude of the maximum value. Based on the spread, the processor can determine the rebalance value to be used to balance or modify the first plurality of PWM signals. The processor can determine the rebalance value based on the spread in accordance with a function (e.g., a multiplicative factor).

The processor can generate a second plurality of PWM signals (e.g., the set of rebalanced PWM signals 165') using the rebalance value (520). In generating, the processor can modify at least one PWM signal of the first plurality of PWM signals using the rebalance value. The processor can modify by adding the voltage value of the at least one PWM signal with the rebalance value to generate a corresponding rebalanced PWM signal. With the modification of the first plurality of PWM signals, the processor can produce the second plurality of PWM signals. In some embodiments, the processor can provide the second plurality of PWM signals to the corresponding plurality of legs of the inverter. By extension, the processor can provide the second plurality of PWM signals to one or more electronics components via the legs of the inverter.

While this specification contains various implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, reductant, an air-reductant mixture, exhaust gas, hydrocarbon, an air-hydrocarbon mixture, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values herein are inclusive of their maximum values and minimum values unless otherwise indicated. Furthermore, a range of values does not necessarily require the inclusion of intermediate values within the range of values unless otherwise indicated.

It is important to note that the construction and arrangement of the various systems and the operations according to various techniques shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

What is claimed is:

1. A device for rebalancing pulse width modulation (PWM) signals, comprising:
   a non-transitory computer-readable medium having instructions stored thereon; and
   at least one processor configured to execute the instructions to:
   receive a plurality of PWM signals from a controller generating the plurality of PWM signals having respective duty cycles to be provided to a plurality of legs of an inverter;
   identify a minimum value and a maximum value from at least a subset of the plurality of PWM signals;
   determine a rebalance value based on a spread between the minimum value and the maximum value; and
   modify, using the rebalance value, a respective duty cycle of the respective duty cycles associated with a first PWM signal of the plurality of PWM signals to generate a second PWM signal to provide to a leg of the plurality of legs of the inverter.

2. The device of claim 1, wherein the at least one processor is configured to execute the instructions to:
   identify, from the plurality of PWM signals, a third PWM signal separate from the subset of the plurality of PWM signals; and
   modify the third PWM signal using the rebalance value to generate a fourth PWM signal to provide to a second leg of the inverter.

3. The device of claim 1, wherein the at least one processor is configured to execute the instructions to:
   identify, from a plurality of rebalance modes, a rebalance mode based on a configuration; and
   select, from a plurality of reference PWM signals in accordance with the rebalance mode, a reference PWM signal separate from the subset of the plurality of PWM signals, to be provided to a second leg of the plurality of legs of the inverter.

4. The device of claim 3, wherein the plurality of reference PWM signals comprises: (i) a first reference PWM signal having a zero duty cycle, (ii) a second reference PWM signal having a zero duty cycle prior to a transformation from a direct-quadrature-zero (DQ0) to three-phase, and (iii) a third reference PWM signal having a set duty cycle subsequent to the transformation.

5. The device of claim 1, wherein the at least one processor is configured to:

determine that none of the plurality of PWM signals correspond to a reference PWM signal; and add, responsive to determining that none of the plurality of PWM signals correspond to the reference PWM signal, the reference PWM signal set to null to the plurality of PWM signals.

6. The device of claim 1, wherein the at least one processor is configured to:

determine that at least the subset of the plurality of PWM signals corresponds to a same phase condition; and set, responsive to determining that at least the subset of the plurality of PWM signals corresponds to the same phase condition, the minimum value to null when determining the rebalance value.

7. The device of claim 1, wherein the at least one processor is configured to execute the instructions to determine, based on at least one of a sign of the minimum value or a sign of the maximum value, the spread between the minimum value and the maximum value to reduce overmodulation.

8. A system for providing electrical power using pulse width modulation (PWM) signals, comprising:

a power source configured to provide electrical power;

a controller structured to be coupled with the power source, the controller configured to convert the electrical power to a first plurality of PWM signals having respective duty cycles;

a power inverter structured to be coupled with the controller, the power inverter comprising a plurality of legs to receive a second plurality of PWM signals; and a signal rebalancer structured to be coupled with the controller and the power inverter, and disposed downstream from the controller, the signal rebalancer configured to:

receive the first plurality of PWM signals from the controller;

identify a minimum value and a maximum value from at least a subset of the first plurality of PWM signals;

calculate a rebalance value based on a spread between the minimum value and the maximum value;

adjust, using the rebalance value, the respective duty cycles of the first plurality of PWM signals to generate the second plurality of PWM signals; and provide the second plurality of PWM signals to the plurality of legs of the power inverter.

9. The system of claim 8, further comprising a plurality of power subsystems, each power subsystem of the plurality of power subsystems electrically coupled with the power source, at least one of the plurality of power subsystems housing the controller, the power inverter, and the signal rebalancer.

10. The system of claim 8, wherein the controller comprises (i) a voltage control configured to regulate a voltage for the first plurality of PWM signals and (ii) a current control configured to regulate a current for the first plurality of PWM signals.

11. The system of claim 8, wherein at least one of the plurality of legs of the power inverter corresponds to a reference leg, the reference leg configured to provide at least one PWM signal of the first plurality of PWM signals having an amplitude less than at least one of a remainder of the first plurality of PWM signals.

12. The system of claim 8, wherein the signal rebalancer is further configured to:

determine that none of the first plurality of PWM signals correspond to a reference PWM signal; and generate, responsive to determining that none of the first plurality of PWM signals correspond to the reference PWM signal, the reference PWM signal set to null to provide as the second plurality of PWM signals.

13. The system of claim 8, wherein the signal rebalancer is further configured to calculate, based on at least one of a sign of the minimum value or a sign of the maximum value, the spread between a magnitude of the minimum value and a magnitude of the maximum value.

14. The system of claim 8, wherein the power inverter is further configured to provide the second plurality of PWM signals corresponding to the electrical power to one or more components electrically coupled with the power inverter.

15. A method of rebalancing pulse width modulation (PWM) signals, comprising:

receiving, by a processor, a plurality of PWM signals from a controller generating the plurality of PWM signals having respective duty cycles to be provided to a plurality of legs of an inverter;

determining, by the processor, a spread between a minimum value and a maximum value from at least a subset of the plurality of PWM signals;

generating, by the processor, a rebalance value based on the spread between the minimum value and the maximum value;

modifying, by the processor, using the rebalance value, at least one respective duty cycle of the respective duty cycles associated with at least one PWM signal of the plurality of PWM signals; and providing, by the processor, the at least one PWM signal to a leg of the plurality of legs of the inverter.

16. The method of claim 15, further comprising identifying, by the processor, from the plurality of PWM signals, the at least one PWM signal as a reference signal, the at least one PWM signal separate from the subset of the plurality of PWM signals.

17. The method of claim 15, further comprising selecting, by the processor, from a plurality of reference PWM signals based on a configuration, a reference PWM signal separate from the subset of the plurality of PWM signals to be modified using the rebalance value.

18. The method of claim 17, wherein the plurality of reference PWM signals comprises: (i) a first reference PWM signal having a zero duty cycle, (ii) a second reference PWM signal having a zero duty cycle prior to a transformation from a direct-quadrature-zero (DQ0) to three-phase, and (iii) a third reference PWM signal having a set duty cycle subsequent to the transformation.

19. The method of claim 15, wherein determining the spread further comprises determining, based on at least one of a sign of the minimum value or a sign of the maximum value, the spread between a magnitude of the minimum value and a magnitude of the maximum value.

20. The method of claim 15, further comprising providing, by the processor, via the plurality of legs of the inverter to one or more electronic components, a second plurality of PWM signals generated using the plurality of PWM signals and the rebalance value.

* * * * *